United States Patent [19]

Iwamoto

[11] Patent Number: 5,025,414
[45] Date of Patent: Jun. 18, 1991

[54] SERIAL BUS INTERFACE CAPABLE OF TRANSFERRING DATA IN DIFFERENT FORMATS

[75] Inventor: Shinichi Iwamoto, Tokyo, Japan

[73] Assignee: NEC Corporation, Tokyo, Japan

[21] Appl. No.: 117,738

[22] Filed: Nov. 6, 1987

[30] Foreign Application Priority Data

Nov. 6, 1986 [JP] Japan ............................. 61-265153

[51] Int. Cl.⁵ ............................................. G06F 1/00
[52] U.S. Cl. ............................... 364/900; 364/927.93; 364/935.4; 364/940.81; 364/933; 364/933.7; 364/934; 364/934.2; 364/942.3; 364/942.4
[58] Field of Search ... 364/200 MS File, 900 MS File

[56] References Cited

U.S. PATENT DOCUMENTS

| | | | |
|---|---|---|---|
| 4,215,243 | 7/1980 | Maxwell | 364/200 |
| 4,410,962 | 10/1983 | Daniels et al. | 364/900 |
| 4,458,308 | 7/1984 | Holtey et al. | 364/200 |
| 4,467,418 | 8/1984 | Quinquis | 364/200 |
| 4,493,021 | 1/1985 | Agrawal et al. | 364/200 |
| 4,507,732 | 3/1985 | Catiller et al. | 364/200 |
| 4,567,561 | 1/1986 | Wyatt et al. | 364/200 |
| 4,613,936 | 9/1986 | Andresen | 364/200 |
| 4,958,344 | 9/1990 | Scott | 370/112 |

*Primary Examiner*—Terrell W. Fears
*Assistant Examiner*—Rebecca L. Rudolph
*Attorney, Agent, or Firm*—Foley & Lardner

[57] ABSTRACT

A serial bus interface includes a shift register for receiving and transmitting serial data, a first selector coupled to a serial input of the shift register selectively coupling the serial input of the shift register to either of two serial data lines, and a second selector coupled to a serial output of the shift register selectively coupling the serial output of the shift register to one of the two serial data lines. A clock generator, capable of generating a clock pulse in two different formats, is coupled to a clock line. The clock generator operates to output to the clock line a clock pulse in accordance with a format utilized by one of the serial data lines.

9 Claims, 3 Drawing Sheets

SERIAL BUS INTERFACE CAPABLE OF TRANSFERRING DATA IN DIFFERENT FORMATS

BACKGROUND OF THE INVENTION

1. Field of the Invention

The present invention relates to a serial bus interface capable of transferring data in synchronism with clocks by use of a clock line and a serial data line. More specifically, the present invention relates to such a serial bus interface which can be coupled to a plurality of peripheral devices having different transfer formats and which can execute data transfer to and from any selected one of the peripheral devices in accordance with the selected peripheral device.

2. Description of Related Art

Serial bus interfaces can make it possible to transfer data by means of only one clock line and one data line. Therefore, if a serial bus interface is used, data transfer can be effected between microcomputers and various associated peripheral devices through a small number of lines.

On the other hand, since the serial bus interface has only one clock line and one data line, microcomputers and/or peripheral devices coupled to the clock line and the data line have to have the same transfer format. If one of the peripheral devices coupled to the clock line and the data line has a data transfer format different from the microcomputer and other peripheral devices coupled to the same clock line and data line, even if the microcomputer could transfer the data in the different format to the above one peripheral device, the other peripheral devices coupled to the same clock line and data line may erroneously receive the data transferred in the different format.

SUMMARY OF THE INVENTION

Accordingly, it is an object of the present invention to provide a serial bus interface which has overcome the above mentioned drawback.

Another object of the present invention is to provide a serial bus interface capable of carrying out data transfer to and from various peripheral devices having different transfer formats.

A further object of the present invention is to provide a serial bus interface provided in a microcomputer and capable of carrying out data transfer in various transfer formats.

The above and other objects of the present invention are achieved in accordance with the present invention by a serial bus interface comprising a shift register receiving and transmitting serial data, a first selector coupled to a serial input of the shift register selectively coupling the input of the shift register to one of at least two serial data lines, a second selector coupled to a serial output of the shift register selectively coupling the output of the shift register to one of the serial data lines, and a clock generator coupled to a clock line and capable of generating a clock pulse in at least two different formats, the clock generator operating to output to the clock line a clock pulse in accordance with a format adopted in one of the serial data lines selected by a selector.

The above and other objects, features and advantages of the present invention will be apparent from the following description of the preferred embodiment of the invention with reference to the accompanying drawings.

DESCRIPTION OF THE PREFERRED EMBODIMENT

Figure 1:
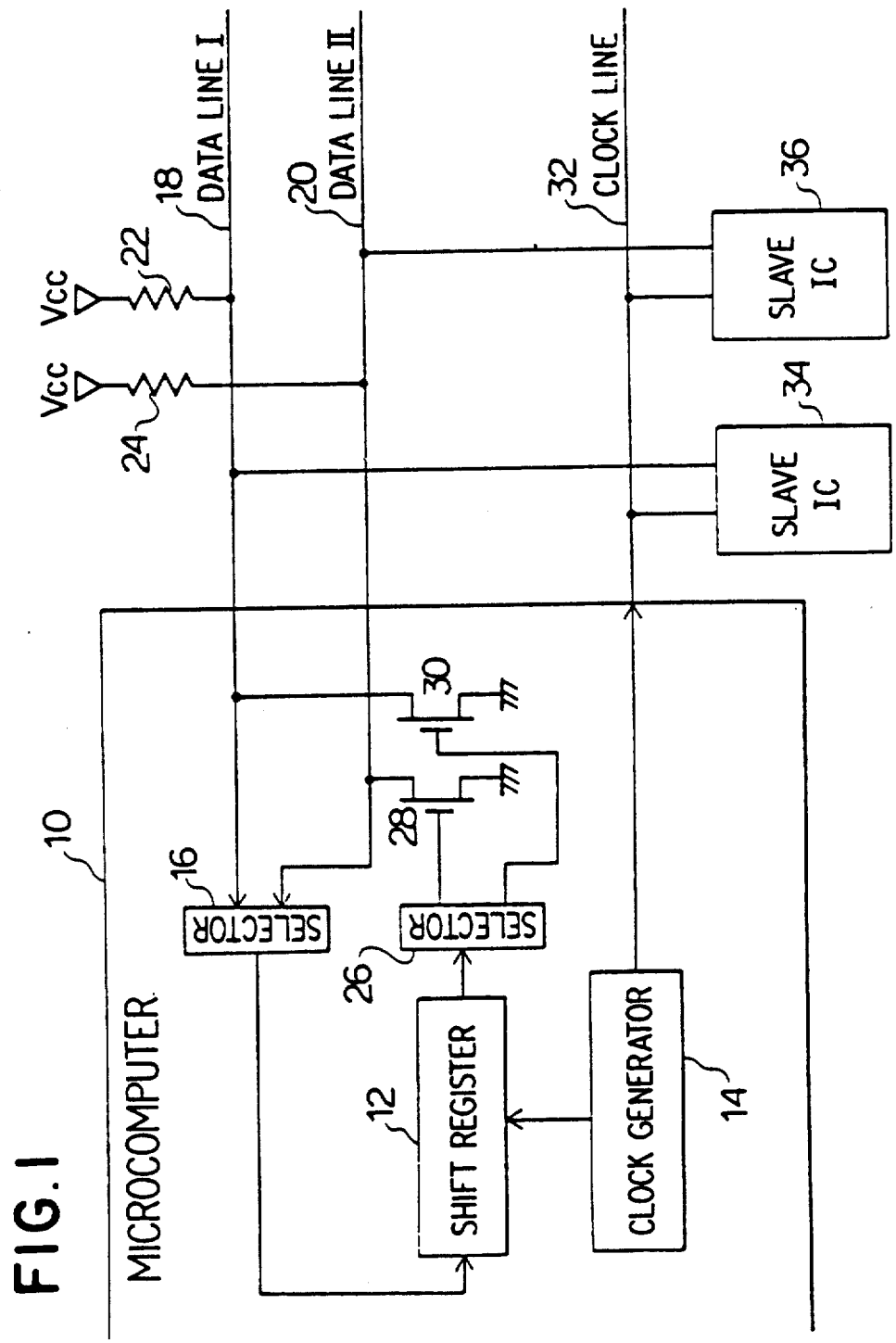
FIG. 1 is a block diagram of one embodiment of a serial bus interface in accordance with the present invention.

Referring to FIG. 1, there is shown in a block diagram one embodiment of a serial bus interface in accordance with the present invention, which is incorporated in a microcomputer 10 functioning as a master device in a serial data transfer.

The serial bus interface includes a shift register 12 controlled by a clock generator 14 to convert parallel data into serial data in synchronism with clock signals supplied from the clock generator 14 as well as to receive serial data in synchronism with clock signals for generating parallel data. The shift register 12 has a serial data input connected to an output of a first selector 16, which in turn has a pair of inputs connected to first and second serial data lines 18 and 20, respectively. These data lines 18 and 20 are pulled up through resisters 22 and 24 to a voltage Vcc, respectively.

The shift register 12 also has a serial data output connected to an input of a second selector 26, which in turn has a pair of outputs connected to respective gates of two source-grounded N-channel field effect transistors 28 and 30. Drains of the transistors 28 and 30 are connected to the first and second data lines 18 and 20, respectively. Namely, the transistors 28 and 30 constitute an open-drain type data output buffer, respectively, so that wired logic is formed on each of the data lines. Slave ICs 34 and 36 have a similar open-drain type data output buffer.

The clock generator 14 has a clock output connected to a clock line 32, which is in turn connected to clock inputs of two slave IC devices 34 and 36. One of these slave IC devices 34 is connected at its data input/output to the first data line 18, and the other slave IC device 36 is connected at its data input/output to the second data line 20.

Figure 2:
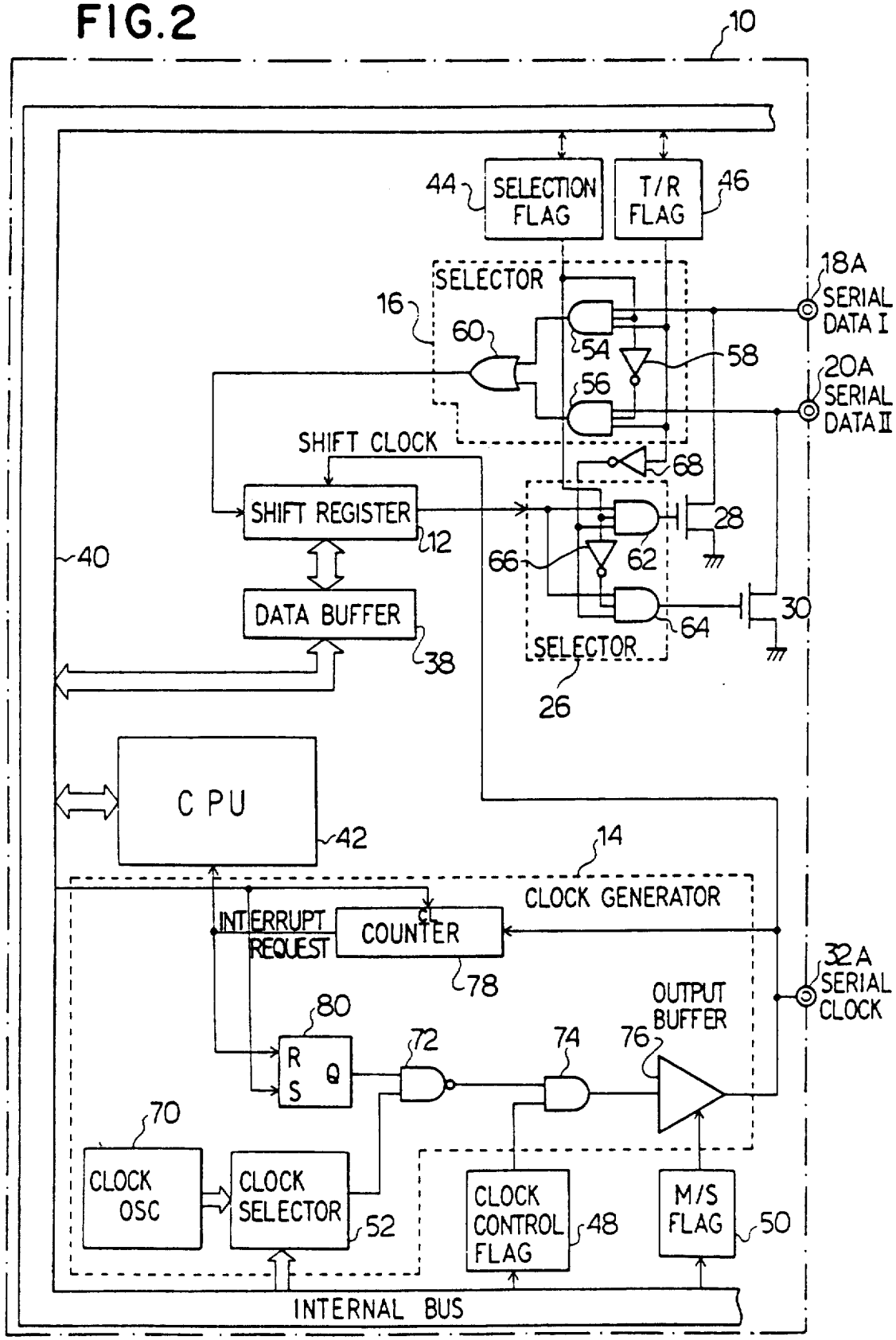
FIG. 2 is a block diagram of a more specific form of the serial bus interface shown in FIG. 1.

Turning to FIG. 2, the serial bus interface is shown in a more specific form. The shift register 12 is coupled at its parallel data input/output to a data buffer 38, which is coupled to an internal bus 40 provided in the microcomputer 10. To the internal bus 40 are coupled a central processing unit (CPU) 42, a data line selection flag 44, a transmission/reception (T/R) flag 46, a clock control flag 48, a master/slave (M/S) flag 50, and a clock selector 52 provided in the clock generator 14.

The first selector 16 has a pair of three-input AND gates 54 and 56, whose respective first inputs are connected to the T/R flag 46. A second input of the AND gate 54 is connected directly to the selection flag 44, and a second input of the AND gate 56 is connected through an inverter 58 to the selection flag 44. Third inputs of the AND gates 54 and 56 are connected to first and second serial data terminals 18A and 20A connected to the first and second data lines 18 and 20, respectively. Outputs of the AND gates 54 are connected to an OR gate 60, whose output is connected to the serial data input of the shift register 12.

The second selector 26 has a pair of three-input AND gates 62 and 64, whose respective first inputs are connected to the serial data output of the shift register 12. A second input of the AND gate 62 is connected directly to the selection flag 44, and a second input of the AND gate 64 is connected through an inverter 66 to the selection flag 44. The AND gates 62 and 64 are connected at their respective third inputs through an inverter 68 to the T/R flag 46, and are coupled at their outputs to the gates of the source-grounded transistors 28 and 30, respectively, whose drains are respectively connected to the first and second serial data terminals 18A and 20A.

The clock generator 14 has a clock oscillator 70 outputting various clock pulses to the clock selector 52. The clock selector 52 is set through the internal bus 40 to output a clock pulse of a selected rate to one input of a NAND gate 72. An output of the NAND gate 72 is connected to one input of an AND gate 74, whose other input is connected to the clock control flag 48. An output of the AND gate 74 is connected to an output buffer 76 controlled by the M/S flag 50. The output buffer 76 is constituted of for example a push-pull transistor circuit, and is connected at its output to a serial clock terminal 32A connected to the clock line 32. The output of the buffer 76 is also connected to the shift register 12 and an input of a counter 78 of for example 3 bits. A carry of this counter 78 is supplied as an interrupt request signal to the CPU 42 and to a reset input of a R/S flipflop 80. The Q output of the flipflop 80 is connected to a second input of the NAND gate 72. The counter 78 is cleared by a signal supplied from the internal bus 40, and the flipflop 80 is set by the same signal.

Now, operation will be explained using a first example in which 8-bit data is transferred from the microcomputer 10 to the slave IC 34 and using a second example in which the microcomputer 10 receives 9-bit data from the slave IC 36.

In the first example, since the microcomputer 10 functions as a master station controlling a serial clock on the clock line 32, the M/S flag 50 is set to "1" by the CPU 42 through the internal bus 40, so that the output buffer 76 can control the level on the clock lines. (If the microcomputer 10 acts as a slave station, the M/S flag 50 is set to "0" so that the output buffer 76 has a high output impedance.)

Thereafter, the CPU makes the following settings through the internal bus 40 before transferring data to the slave IC 34.

Figure 3:
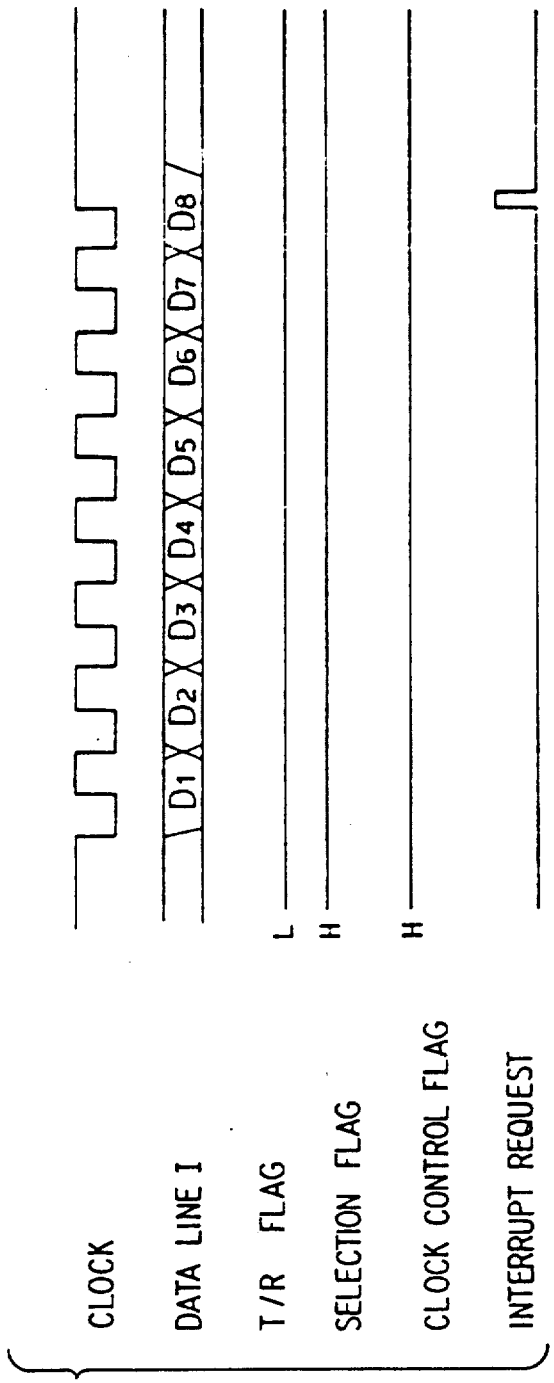
FIGS. 3 and 4 respectively illustrate transfer formats realized in the serial bus interface shown in FIG. 2.

Namely, the T/R flag 46 is set to "0" as shown in FIG. 3, so that the AND gates 54 and 56 are put in a closed condition. Therefore, the selector 16 cannot operate. On the other hand, the selection flag 44 is set to "1" as shown in FIG. 3, with the result that the AND gate 64 is put in a closed condition. Thus, only the AND gate 62 is put in a condition capable of passing its input to the gate of a transistor.

In this condition, 8-bit parallel data to be transferred is written into the shift register 12 through the data buffer 38 from the internal bus 40. A transfer rate data is written into the clock selector 52 so that the selector 52 produces a clock signal of a designated pulse rate from the output of the clock oscillator 70. The clock control flag 48 is set to "1" as shown in FIG. 3. Further, a signal is supplied to a clear input CL of the counter 78 so as to clear the counter 78, and to the set input S of the flipflop 80 so that the Q output of the flipflop 80 is set to "1".

Thus, the clock signal of the designated pulse rate is supplied from the clock oscillator 70 through the clock selector 52, the NAND gate 72 and the AND gate 74 to the output buffer 76, is then further outputted from the output buffer 76 through the serial clock line 32 to the slave ICs 34 and 36, as shown in FIG. 3.

The clock signal outputted from the output buffer 76 is also supplied to the shift register 12 as the shift clock, so that the shift register 12 performs its shift operation in synchronism with the falling edge of each received shift clock. As mentioned above, since only the AND gate 62 is in an open condition, i.e., in a signal passable condition, the data serially outputted from the shift register 12 is applied to the gate of the transistor 28, so that the transistor 28 is turned on or off in accordance with the signal inputted to the gate. As mentioned hereinbefore, the data lines 18 and 20 are pulled up to the voltage Vcc through the resistors 22 and 24, respectively, and therefore, a wired logic circuit is formed on each of the data lines. Accordingly, if the transistor 28 is turned off, the data line 18 is pulled up to a high level, and if the transistor 28 is turned on, the data line 18 is pulled down to a low level. In this manner, the serial data is outputted to the data line 18.

On the other hand, the slave IC 34 fetches the level on the data line 18 in synchronism with the rising edge of each clock signal supplied through the clock line 32.

As mentioned above, the data is serially outputted from the computer 10 (the master station) in synchronism with the falling edge of each clock pulse, and the slave IC 34 fetches the data in synchronism with the rising edge of each clock pulse.

As mentioned above, since the counter 78 has three bits, when the counter 78 counts eight clock pulses, the counter 78 generates a carry signal as the interrupt signal, as shown in FIG. 3. This interrupt signal is supplied to the reset input of the flipflop 80 so that the Q output of the flipflop 80 is brought into "0". As a result, the NAND gate 72 is closed, and, the output of the clock pulse is stopped. The interrupt signal is also supplied to the CPU 42. In response to this signal, the CPU 42 reads the content of the selection flag 44, and discriminates the destination of the data communication. In this case, since the selection flag 44 is set with "1" indicating the data line 18 through which serial data is transferred in an 8-bit format, the CPU 42 can start preparation for another data transfer or reception, or can restart suspended data processing if data communication is not necessary.

Figure 4:
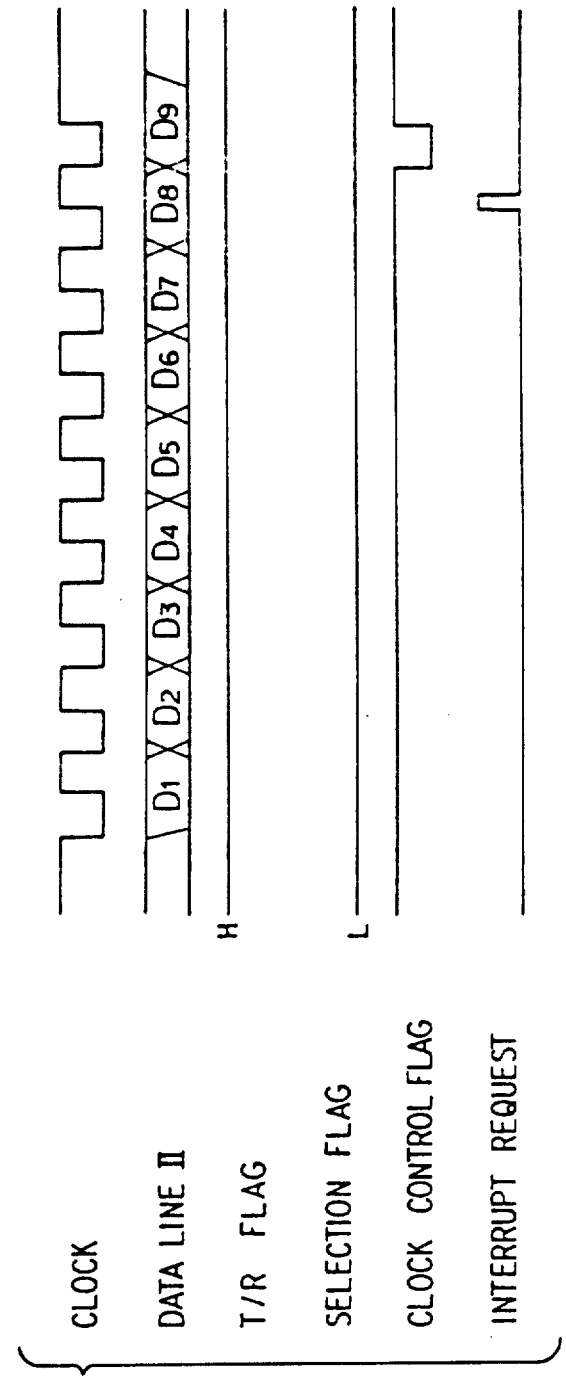

In the case of receiving the 9-bit data from the slave IC 36, the CPU 42 sends through the internal bus 40 various instructions for preparation of data reception. First, the T/R flag 46 is set to "1" as shown in FIG. 4 so that the microcomputer is put in a data reception mode. As a result, the AND gates 62 and 64 are closed, so that the transistors 28 and 30 are maintained off. Further, the selection flag 44 is set to "0" as shown in FIG. 4, so that the AND gate 54 is put in a closed condition, and only the AND gate 56 is maintained in an open condition, i.e., in a signal passable condition. The clock control flag 48 is set to "1" as shown in FIG. 4, and a data reception rate is set to the clock selector 52. The counter 78 is cleared and the flipflop 80 is set, similarly to data transmission.

Thus, a clock pulse of a designated pulse rate is supplied from the clock terminal 32A through the clock line 32 to the slave IC 36. In synchronism with the falling edge of each clock pulse from the microcomputer 10, the slave IC 36 outputs serial data on the data line 20 one bit by one bit. The serial data outputted on the data line 20 is supplied through the AND gate 56 and the OR gate 60 to the serial data input of the shift register 12. This shift register fetches the input data on the rising edge of each shift clock supplied from the output buffer 76.

When eight clock pulses are generated, the counter 78 generates the carry signal, i.e., the interrupt request signal as shown in FIG. 4, which is applied to the reset input of the flipflop 80. Namely, the flipflop 80 is reset, and the generation of the clock pulse is stopped. Further, the interrupt request signal is also inputted to the CPU 42. In response to this signal, the CPU 42 reads the content of the selection flag 44, and discriminates the destination of the data communication. In this case, since the selection flag 44 is set with "0", the CPU 42 judges that the destination of the data transmission/reception is the slave IC 36 having a 9-bit format. If the flag 44 was "1", it would be judged that the destination of the data transmission/reception is the slave IC 34. If it is discriminated that the destination is the slave IC 36, the CPU 42 writes "0" into the clock control flag 29 as shown in FIG. 4. As a result, the output of the AND gate 74 is brought to a low level, and therefore, the clock line 32 is inverted to the low level.

In response to the falling of the level on the clock line 32, the slave IC 36 outputs a ninth data bit to the data line 20. Thereafter, the CPU 42 writes "1" to the clock control flag 48 again as shown in FIG. 4, so that the output of the AND gate 74 is returned to the high level. Thus, in response to the rising of the level on the clock line 32, the shift register 12 fetches the ninth data bit from the slave IC 36.

Thereafter, the CPU 42 reads the 9-bit data in the shift register 12 through the data buffer 38, and then, executes necessary data processing.

When receiving 8-bit data from the slave IC 34, since the selection flag 44 is set to "1", when the interrupt request signal is generated by the counter 78, the CPU judges from the content of the selection flag 44 that the destination of the data communication is the slave IC 34. In this case, the CPU 42 will not write "0" and "1" to the clock control flag 48.

In the case of transferring 9-bit data to the slave IC 36, since the selection flag 44 is set to "0", when the interrupt request signal is generated by the counter 78, the CPU judges from the content of the selection flag 44 that the destination of the data communication is the slave IC 36. In this case, the CPU 42 will sequentially write "0" and "1" to the clock control flag 48, so that a ninth clock pulse is generated from the output buffer 76. Accordingly, a ninth data bit is outputted from the shift register 12 to the data line 20.

The invention has thus been shown and described with reference to a specific embodiment. However, it should be noted that the invention is in no way limited to the details of the illustrated structures but changes and modifications may be made within the scope of the appended claims.

For example, if "0" and "1" are written into the clock control flag 48 two times the system can control a slave IC having a 10-bit serial data transfer format. In addition, two or more slave ICs can be coupled to the clock line 32 and each of the data lines 18 and 20.

I claim:

1. A master processor for use in a serial data transfer system, the master processor being interconnected to at least first and second slave devices through the same single serial clock line, the master processor being interconnected to the first slave device through a first serial data line and the master processor being interconnected to the second slave device through a second serial data line, the master processor comprising:
   a shift register commonly receiving and transmitting serial data transferred from and to be transferred through the first and second serial data lines,
   a first selector, coupled to a serial input of the shift register, capable of selectively coupling the serial input of the shift register to either one of the first and second serial data lines,
   a second selector, coupled to a serial output of the shift register, capable of selectively coupling the serial output of the shift register to either one of the first and second serial data lines, and
   a clock generator, coupled to the single serial clock line, capable of generating a clock pulse in at least two different transfer formats which are different from each other in the number of clock pulses to be supplied to the shift register, the clock generator operating to output to the single serial clock line a clock pulse in accordance with a format utilized by one of the first and second serial data lines selected by either the first selector or the second selector.

2. A master processor as claimed in claim 1 further including:
   a central processing unit (CPU) coupled to an internal bus of the master processor,
   a format selection flag register located within the master processor and coupled to the internal bus and set by the CPU, and
   a transmission/reception flag register located within the master processor and coupled to the internal bus and set by the CPU, and wherein
   the first and second selectors are set in accordance with the contents of the format selection flag register and the transmission/reception flag register.

3. A master processor for use in a serial data transfer system, the master processor being interconnected to at least first and second slave devices through the same single serial clock line, the master processor being interconnected to the first slave device through a first serial data line and the master processor being interconnected to the second slave device through a second serial data line, the master processor comprising:
   a shift register receiving and transmitting serial data,
   a first selector, coupled to a serial input of the shift register, capable of selectively coupling the serial input of the shift register to either one of the first and second serial data lines,
   a second selector, coupled to a serial output of the shift register, capable of selectively coupling the serial output of the shift register to either one of the first and second serial data lines,
   a clock generator, coupled to the single serial clock line, capable of generating a clock pulse in at least two different transfer formats which are different from each other in the number of clock pulses to be supplied to the shift register, the clock generator operating to output to the single serial clock line a clock pulse in accordance with a format utilized by one of the first and second serial data lines selected by either the first selector or the second selector, a central processing unit (CPU) coupled to an internal bus of the master processor, a format selection flag register located within the master processor and coupled to the internal bus and set by the CPU, and a transmission/reception flag register located within the master processor and coupled to the internal bus and set by the CPU, and wherein the first and second selectors are set in accordance with the contents of the format selection flag register and the transmission/reception flag register, the master processor further including a clock control flag register, coupled to the internal bus and set by the CPU via the internal bus, and wherein the clock generator includes a clock selector which generates a clock signal at a pulse rate capable of being varied by the CPU, a NAND gate having a first input connected to receive the clock signal from the clock selector, an AND gate connected at a third input to an output of the NAND gate and at a fourth input to the clock control flag register so as to output the clock signal to the clock terminal for a period in which the clock control flag register is set to "1", a counter, connected to receive the clock signal, generating an interrupt request signal when the counter counts to a predetermined value, and a flipflop having a set input connected to receive a set signal via the internal bus and a reset input connected to receive the interrupt request signal from the counter, and wherein an output of the flipflop is connected to a second input of the NAND gate so that clock signals of a number corresponding to the predetermined value are outputted at a designated pulse rate from the clock terminal by setting the flipflop and setting the clock control flag register.

4. A master processor as claimed in claim 3 wherein the CPU discriminates a content of the format selection flag register when the interrupt request signal is generated, and when the format selection flag register indicates a first format, the CPU maintains a content of the clock control flag register unchanged, and when the format selection flag register indicates a second format, the CPU sequentially writes "0" and "1" into the clock control flag register so that an additional clock signal is generated from the AND gate.

5. A master processor for use in a serial data transfer system, the master processor being interconnected to at least first and second slave devices through the same single serial clock line, the master processor being interconnected to the first slave device through a first serial data line and the master processor being interconnected to the second slave device through a second serial data line, the master processor comprising:

a shift register commonly receiving and transmitting serial data transferred from and to be transferred through the first and second serial data lines, a selector, coupled to input terminals of the shift register, selectively coupling the shift register to either one of the first and second serial data lines, and a clock generator, coupled to the single serial clock line, capable of generating a clock pulse in at least two different transfer formats which are different from each other in the number of clock pulses to be supplied to the shift register, the clock generator operating to output to the single serial clock line a clock pulse in accordance with a format utilized by one of the first and second serial data lines selected by the selector.

6. A serial data transfer system comprising:

a first serial data line;

a second serial data line;

a single serial clock line;

a first slave station having a first data input/output terminal coupled to the first serial data line and a first clock terminal coupled to the single serial clock line;

a second slave station having a second data input/output terminal coupled to the second serial data line and a second clock terminal coupled to the single serial clock line; and a master station having a first serial data input/output terminal coupled to the first serial data line, a second serial data input/output terminal coupled to the second serial data line, and a serial clock terminal coupled to the single serial clock line, the master station operating to supply to the single serial clock terminal a first number of clock signals when data is transferred between the master station and the first slave station, and a second number of clock signals, different in number from the first number of clock signals, when data is transferred between the master station and the second slave station, such that the master station can respectively communicate with the first and second slave stations in two different transfer formats which are different from each other in the number of clock pulses to be supplied.

7. A serial data transfer system comprising:

a first serial data line;

a second serial data line;

a single serial clock line;

a first slave station having a first data input/output terminal coupled to the first serial data line and a first clock terminal coupled to the single serial clock line;

a second slave station having a second data input/output terminal coupled to the second serial data line and a second clock terminal coupled to the single serial clock line;

a master station including, a shift register commonly receiving and transmitting serial data transferred from and to be transferred through the first and second serial data lines, a selector, coupled to output terminals of the shift register, selectively coupling the shift register to either one of first and second serial data lines, and a clock generator, coupled to the single serial clock line, capable of generating a clock pulse in at least two transfer formats which are different from each other in the number of clock pulses to be supplied to the shift register, the clock generator operating to output to the single serial clock line a clock pulse in accordance with a format utilized by one of the first and second serial data lines selected by the selector.

8. A master processor for use in a serial data transfer system, the master processor being interconnected to at least first and second slave devices through the same single serial clock line, the master processor being interconnected to the first slave device through a first serial data line and the master processor being interconnected to the second slave device through a second serial data line, the master processor comprising:

a first data transfer terminal to be connected through the first serial data line to the first slave device;

a second data transfer terminal to be connected through the second serial data line to the second slave device;

a single serial clock terminal to be connected through the single serial clock line to the first slave device and to the second slave device;

a shift register temporarily holding data to be transferred and having a shift output terminal to shift and output temporarily held data, bit by bit, through said shift output terminal in synchronism with a shift clock pulse;

clock generating means for generating a clock pulse so as to supply a generated clock pulse to said clock terminal and also so as to supply said generated clock pulse to said shift register as said shift clock pulse;

a selector having an input connected to said shift output terminal, a first output connected to said first data transfer terminal, and a second output connected to said second data transfer terminal, said selector operating to connect said shift output terminal to said first data transfer terminal in a first data transfer mode, and operating to connect said shift output terminal to said second data transfer terminal in a second data transfer mode, the first and second data transfer modes being different from each other in the number of clock pulses to be supplied to the shift register;

detection means, coupled to said clock generating means, for generating a detection signal when a predetermined number of clock pulses has been generated by the clock generating means; and control means, responding to the detection signal, for controlling said clock generating means so as to cause, in the first data transfer mode, the clock generating means to stop generating a clock pulse, and to cause in the second data transfer mode, the clock generating means to generate at least one additional clock pulse.

9. A master processor for use in a serial data transfer system, the master processor being interconnected to at least first and second slave devices through the same single serial clock line, the master processor being interconnected to the first slave device through a first serial data line and the master processor being interconnected to the second slave device through a second serial data line, the master processor comprising:

a first data transfer terminal to be connected through the first serial data line to the first slave device;

a second data transfer terminal to be connected through the second serial data line to the second slave device;

a single serial clock terminal to be connected through the single serial clock line to the first slave device and to the second slave device;

a shift register temporarily holding received data and having a shift input terminal to shift and receive, bit by bit, data inputted to the shift input terminal in synchronism with a shift clock pulse;

clock generating means for generating a clock pulse so as to supply a generated clock pulse to said clock terminal and also so as to supply the generated clock pulse to the shift register as the shift clock pulse;

a selector having a first input connected to the first data transfer terminal, a second input connected to the second data transfer terminal, and an output connected to the shift input terminal, the selector operating to connect the first data transfer terminal to the shift input terminal in a first data transfer mode, and operating to connect the second data transfer terminal to the shift input terminal in a second data transfer mode the first and second data transfer modes being different from each other in the number of clock pulses to be supplied to the shift register;

detection means, coupled to the clock generating means, for generating a detection signal when a predetermined number of clock pulses has been generated by the clock generating means; and control means, responding to the detection signal, for controlling the clock generating means so as to cause, in the first data transfer mode, the clock generating means to stop generating a clock pulse and to cause in the second data transfer mode, the clock generating means to generate at least one additional clock pulse.

* * * * *